G. A. HOLMES.
SNAP FASTENER.
APPLICATION FILED MAY 7, 1920.
1,376,389. Patented Apr. 26, 1921.
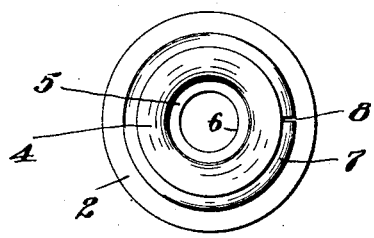
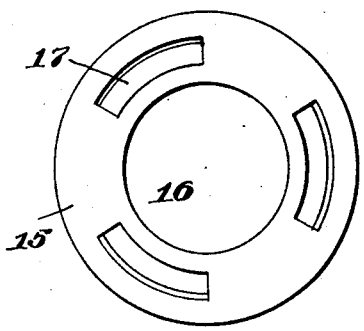
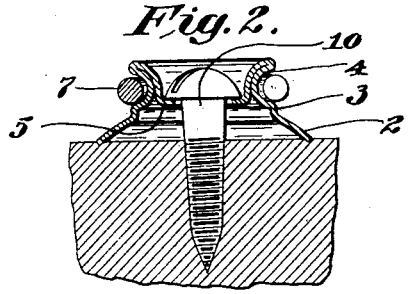
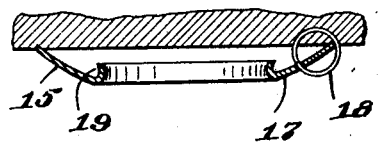
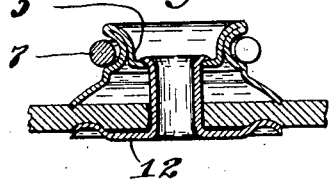
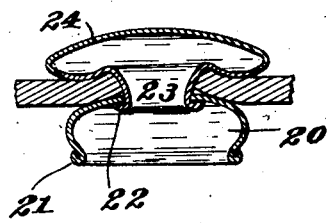
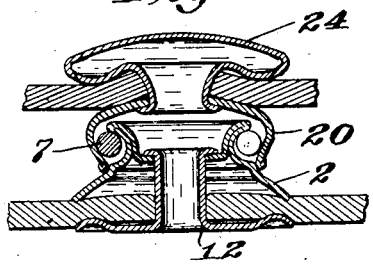
Inventor
Geo. A. Holmes,
Wm. B. H. Down
Attorney

UNITED STATES PATENT OFFICE.

GEORGE A. HOLMES, OF NEWTON CENTER, MASSACHUSETTS, ASSIGNOR TO FRED JOY, OF WINCHESTER, MASSACHUSETTS.

SNAP-FASTENER.

1,376,389. Specification of Letters Patent. Patented Apr. 26, 1921.

Application filed May 7, 1920. Serial No. 379,443.

*To all whom it may concern:*

Be it known that I, GEORGE A. HOLMES, a citizen of the United States, and residing at 140 Sumner St., Newton Center, Massachusetts, have invented certain new and useful Improvements in Snap-Fasteners, of which the following is a specification.

This invention relates to a stud and socket fastener of the kind commonly known as snap fasteners and consists in part in a novel construction of the stud member by which it is adapted to be secured to a fabric or similar material by an attaching eyelet, or may be fastened to a solid material such as a floor or the body of a vehicle by a screw, the snap fastener device being of strong and durable construction and suitable for fastening together layers of fabric as a glove or garment fastener, or for fastening a rug or carpet to the floor, or a vehicle curtain to the body of the vehicle.

The fastener is of that kind in which the stud member is provided with a spring in the form of a split ring which is contracted circumferentially in being forced through the mouth or opening of the socket member, and expands in the socket member to hold it securely to the stud member until forcibly pulled away therefrom in the operation of unfastening the part held by the fastener.

Figure 1 is a plan view of the stud member of the snap fastener embodying this invention.

Fig. 2, a sectional view thereof showing the fastening member secured to solid material, as to the floor, by a screw.

Figs. 3 and 4, plan and sectional views respectively of a socket member adapted to be sewn to the underside of a rug or carpet, for example, to coöperate with the stud member when secured as shown in Fig. 2.

Fig. 5, a sectional view of the stud member shown in Fig. 1, secured to a fabric or similar material by an attaching eyelet.

Fig. 6, a sectional view of a socket member secured to fabric or like material by an eyelet and adapted to coöperate with the stud member when attached either as in Fig. 4 or in Fig. 5; and Fig. 7, a sectional view showing the members of the fastener engaged with one another for the purpose of fastening together two layers of fabric as in a garment or glove fastener.

Referring to Figs. 1 and 2, the main portion of the stud member is shown as composed of a single piece of sheet metal shaped to form a base 2, surrounding a short shank 3, in the side of which is an annular recess 4, to contain the spring. Above the spring recess 4, the material is folded back within the spring recess toward the base 2, and at or near the level of the deepest part of the spring recess there is an inwardly projecting flange 5, surrounding a central aperture 6.

The spring 7 is composed of a piece of spring wire bent to form a ring, but with a slight gap as indicated at 8 in Fig. 1 between the adjacent ends of the wire so that a split rather than a complete ring is produced, which is capable of being circumferentially contracted or expanded, and returns to its original condition when the force by which it has been expanded or contracted is withdrawn.

In its normal or unstressed condition the internal diameter of the spring ring is considerably larger than that of the bottom of the annular recess 4, so that the ring may be contracted into said recess, and the outer diameter of the spring ring is substantially larger than the shank portion of the stud that contains the spring recess, so that the spring normally projects circumferentially beyond the circumference of the outer end portion of the stud as clearly shown in Figs. 1 and 2.

The stud member having the apertured internal flange 5 depressed below the outer end thereof, is adapted to be secured to the material by a central fastening device which may be for example a screw 10 as shown in Fig. 2, the shank of which passes through the aperture 6, while the head of the screw bears upon the flange 5, the head of the screw being contained within the depression formed in the outer end of the stud shank by the folding of the metal back into the inside of the spring recess.

Said stud is however equally well adapted to be fastened by an eyelet 12, as shown in Figs. 5 and 6, and thus may be securely fastened to leather, fabric or like material when appropriate to the use to which the fastener is to be put.

When fastened to rigid material by a screw 10 as shown in Fig. 2 the stud member is well adapted for use in connection with a suitable socket member for fastening a rug to the floor or a vehicle curtain to the body of the vehicle, and a desirable socket member for a rug or carpet fastening may be constructed as shown in Fig. 3 of a single piece of sheet metal 15, having an aperture 16, slightly larger than the outer end of the shank portion of the stud but smaller than the normal outer circumference of the spring 7. The plate or disk 15 may be slightly dished or convexed as shown in Fig. 4 and is provided with perforations 17, through which may be passed thread or other fastening as indicated at 18, Fig. 4 to attach the said socket piece to the under-surface of the rug or carpet to be fastened.

The plate 15 is shown as having an inwardly turned flange 19 (Fig. 4) surrounding the aperture 16 to reinforce or stiffen the plate and afford a smooth and sufficient bearing surface for coöperation with the spring 7 of the stud member.

When preferred the socket member may be composed of a cup shaped body portion 20, as shown in Fig. 6, the outer edge of which is folded or rolled as shown at 21 to stiffen and reinforce the same and afford an opening into the cup shaped recess which at its most contracted part is somewhat smaller than the normal size of the spring 7 of the stud member as is well shown in Fig. 7.

The cup shaped body 20 also has a central aperture 22, which may be engaged by a fastening eyelet 23 shown as made with an unperforated base covering 24, which may be of ornamental appearance to show as a button at the outside of the garment when fastened by the herein described fastener as shown in Fig. 7.

By reference to Fig. 7 it will be seen that the most contracted part of the mouth or opening into the socket member is passed below the largest part of the spring 7 and that the latter in its elastic expansion bears against the inner surface of the socket member with a tendency to wedge the same down tightly against the base portion 2 of the stud member adjacent to the shank 3, thus holding the parts fastened together without looseness such as is exhibited in connection with many kinds of snap fasteners.

The formation of the centrally apertured recess in the stud member by folding the metal back within the spring recess in the shank as shown, reinforces and strengthens the most exposed part of the stud making the construction a very strong as well as a very simple one.

I claim :—

1. A snap fastener consisting of a socket member and a stud member composed of a main portion having a base flange and a hollow shank provided with an annular spring recess surrounding the same and an inwardly projecting attaching flange within the hollow shank, combined with a split ring spring in said spring recess, having its outer circumference normally projecting beyond the circumference of said shank substantially as described.

2. A snap fastener having a socket member and a stud member consisting of a main body portion composed of a single piece of sheet metal having a base flange and a hollow shank having an external annular groove to receive a spring and a portion folded back within the spring recess and having an inwardly projecting flange for engagement by an attaching device, and a split ring spring contained in said spring recess substantially as described.

In testimony whereof, I have signed my name to this specification.

GEORGE A. HOLMES.